Patented Jan. 22, 1946

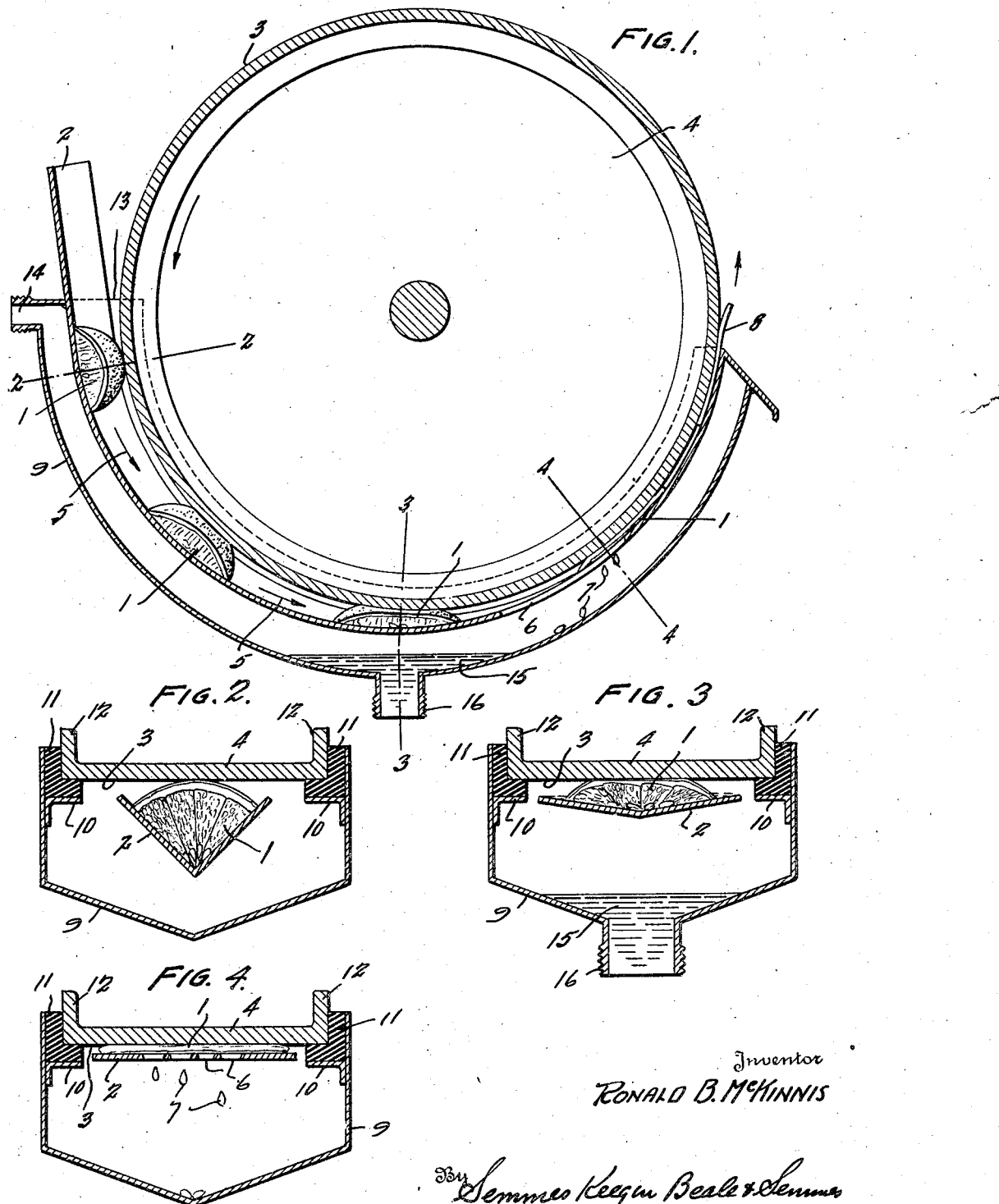

2,393,475

UNITED STATES PATENT OFFICE 2,393,475

APPARATUS FOR EXTRACTING OIL FREE NONOXIDIZED JUICE

Ronald B. McKinnis, Winter Haven, Fla.

Original application May 6, 1940, Serial No. 333,671. Divided and this application November 20, 1943, Serial No. 511,194

8 Claims. (Cl. 99—239)

This invention is a division of my copending application Serial No. 333,671, filed May 6, 1940, since issued into Patent No. 2,337,261, dated December 21, 1943, and relates to an apparatus for extracting juice from fruits and vegetables, and is particularly applicable to extraction of juice from citrus fruits, though it is not exclusively of use with fruits of that type.

One of the desirable features of a process for juice extraction is to provide means for obtaining substantially all of the juice, but without causing the juice to mix with the essential oils of the skin. If too much essential oil gets into the juice of oranges or grapefruit, the taste of the juice is objectionable.

Furthermore, it is desirable that the extracting be performed under non-oxidizing conditions. The delicate flavor and vitamin content of fruit juices is injured by exposure to the oxygen of the air. This deterioration occurs on relatively short exposure, and is progressive. That is to say, after the juice has been canned the deterioration of the flavor and vitamin content continues if oxidation processes have been initiated prior to canning.

Objects of the present invention are to provide an apparatus which will be simple and inexpensive, and which will extract juice which is substantially uncontaminated by the essential oils of the skin or peel.

A further object of the invention is to provide an apparatus in which oxidation of the juices is substantially inhibited.

In general my invention consists in extracting the juice from fruits and vegetables, such as citrus fruit, by cutting the fruit into small segments, for instance by quartering it, and then pressing these quartered sections. I maintain the peel in contact with one surface and the cut portion of the fruit in contact with another surface. Thus when the juice is expressed the essential oils found in the peel are prevented from coming into contact with the expressed juice. A guide means is provided for guiding the segments in their passage between the surfaces which perform the squeezing. This guide means may be in the form of a trough which fits the segment of fruit being extracted. For instance, where segments of quartered fruit are used the walls of the guideway will form substantially a 90° angle to each other at the start of the process. The guideway becomes flattened as the segment is pressed and a seed extracting section is provided. The whole operation is carried on in the presence of inert gas, such as carbon dioxide, nitrogen, or a mixture of the two, or other inert gases.

By making the segments of the fruit comparatively small, such as by quartering them, I am enabled to minimize the rupturing of the oil sacs in the peel. This feature of minimizing the rupturing of the oil sacs is accomplished first by gradually flattening out the peel during its passage through the squeezing mechanism, and secondly by having the peel area sufficiently small so that it does not have to be subjected to severe bending forces and thus the tendency of the oil sacs to rupture and discharge the essential oils is largely inhibited.

In the drawing:

Figure 1 is a sectional view showing diagrammatically one form of apparatus which I may employ;

Figure 2 is a sectional view taken along the line 2—2 of Figure 1;

Figure 3 is a sectional view taken along the line 3—3 of Figure 1;

Figure 4 is a sectional view taken along the line 4—4 of Figure 1.

The whole citrus fruit, for instance where oranges are being extracted, is quartered, and the quartered sections, which I have shown by the numeral 1, are passed into a chute 2, whose sides form an angle with each other of approximately 90°, as is shown in Figure 2. The seed sac side of the segment contacts the side walls of the chute 2, and the peel portion of the segment is adapted to bear against the periphery 3 of a rotating element 4. The movement of the rotating element 4 in the direction indicated by the arrow will cause the segments 1 of fruit to be carried along as illustrated by arrows 5. The trough 2 is gradually flattened out, as illustrated in Figures 3 and 4. In Figure 3 the angle formed by the sides of the trough 2 is shown to be about 170°. In Figure 4 the trough has become flattened out.

During the passage of the segment 1 along the trough 2, the segment is gradually flattened, as illustrated in the drawing, until it reaches a position substantially opposite the line 4—4 of Figure 1. There is formed in the relatively flat section 2 a series of elongated apertures 6 through which seeds 7 can be discharged. The flattened and fully extracted segment 1 is discharged in its flat form, as illustrated at 8 in Figure 1.

The trough 2 is adapted to be housed in a housing 9 which is provided with interior shoulders 10 upon which rest packing element 11 against which bear the periphery 3 of the rotating element 4 and flanges 12 which are formed at right angles to the surface 3. Because of this construction there is a gas-tight fit between the rotating element 4 and the housing 9. At the point 13 where the end of the trough 2 projects outside of the casing 9, a suitable rubber flap, not shown, is provided, or some other construction which will permit the entrance of the segments of fruit 1 without permitting escape of a large quantity of the inert gas, such as $CO_2$, which is fed into the casing 9 through an aperture 14 formed therein.

The extracted juice and seeds are collected in a pool 15 formed at the lowermost point of the casing 9, and can be discharged through an outlet 16 formed at that point. Though the form of device diagrammatically illustrated is adapted to receive quartered fruit, it is obvious that fruit of other size than quarter size may be used. It is desirable that the cut surface of the fruit contact the sides of the chute or trough 2, but this is not absolutely necessary as the pressure exerted by the operation is such as to cause the cut surface of the fruit to quickly conform to the shape of the trough 2. Obviously some carbon dioxide or other inert gas will be lost at the point 13, but since the pressure of the inert gas is not high and also by reason of the flap provided at this point undue loss of inert gas is obviated.

After the juice leaves the aperture 16 at the bottom of the apparatus, it is strained in an oxygen free atmosphere, preferably in an atmosphere of inert gas, and may either then be canned under non-oxidizing conditions and then pasteurized in the containers, or alternately the strained juice may be flash pasteurized and canned under conditions to prevent oxidation of the juice.

While I have shown diagrammatically one form of apparatus, it is obvious that other forms of apparatus may be employed which lie within the spirit of the invention, and I therefore desire that the invention be limited only by the scope of the appended claims and the showing of the prior art.

I claim:

1. An apparatus for extracting juice from segments of citrus fruit comprising a rotatable drum, a stationary plate member spiralling toward the peripheral surface of the drum and forming therewith a constricting passageway, said drum being adapted to move the segments through the passageway to express the juice from the segments, a housing substantially enclosing the plate and passageway, and means for introducing an inert gas to the housing to provide a non-oxidizing atmosphere therein.

2. An apparatus for extracting juice from segments of citrus fruit comprising a rotatable drum, a stationary plate member spiralling toward the peripheral surface of the drum and forming therewith a constricting passageway, said drum being adapted to move the segments through the passageway to express the juice from the segments, a housing substantially enclosing the plate and passageway, means for introducing an inert gas to the housing to provide a non-oxidizing atmosphere therein, said housing constituting a collecting basin for the expressed juice, and means for discharging the collected juice from the housing.

3. An apparatus for extracting juice from segments of citrus fruit comprising a rotatable drum, a stationary plate member spiraling toward the peripheral surface of the drum and forming therewith a constricting passageway, said drum being adapted to move the segments through the passageway to express the juice from the segments, a trough shaped housing member positioned about said plate member and engaging said drum for enclosing said passageway, and means for introducing an inert gas to the housing to provide a non-oxidizing atmosphere therein.

4. An apparatus for extracting juice from segments of citrus fruit comprising a rotatable drum, a stationary plate member spiraling toward the peripheral surface of the drum and forming therewith a constricting passageway, said drum being adapted to move the segments through the passageway to express the juice from the segments, a trough shaped housing positioned about the plate member and having side walls lying adjacent the ends of said drum, flexible gasket means interposed between the said side walls and drum and forming a gas tight seal between said housing and drum and means for introducing inert gas into said housing to provide a non-oxidizing atmosphere therein.

5. An apparatus for extracting juice from segments of citrus fruit comprising a rotatable drum, a stationary substantially arcuate presser plate positioned below said drum and spiralling toward the drum in the direction of rotation thereof, and forming therewith a gradually constricting passageway, the drum being adapted to move the fruit segments through the passageway to express the juice from the segments, apertures in the presser plate, a housing around the presser plate and engaging the drum to substantially enclose said passageway, and means for introducing inert gas into said housing.

6. An apparatus for extracting juice from segments of citrus fruit comprising a movable member, a stationary member having an input end and an output end spiralling toward the movable member forming a gradually constricting passageway, the movable member adapted to move the segments through the passageway, the stationary member being trough shaped at the input end and progressively flattening at the output end whereby the fruit segments are gradually flattened between the movable member and the stationary member to extract the juice as the segments move from the input end to the output end, a housing enclosing said stationary member, and means to admit inert gas within the housing to provide a non-oxidizing atmosphere for the segments moving between the movable member and the stationary member.

7. An apparatus for extracting juice from segments of citrus fruit comprising a rotatable drum member having a smooth cylindrical peripheral surface, and a smooth stationary plate member spiralling toward the peripheral surface of the movable drum forming therewith a gradually constricting passageway, said movable member being adapted to frictionally engage the peel surface of the fruit segments and move said segments through the constricting passageway to compress the segments and extract the juice therefrom, a housing substantially enclosing said plate member and passageway, and means for introducing an inert gas into said housing to provide a non-oxidizing atmosphere therein.

8. An apparatus for extracting juice from segments of citrus fruit comprising a rotatable drum member having a smooth cylindrical peripheral surface, and a smooth stationary plate member spiralling toward the peripheral surface of the movable drum forming therewith a gradually constricting passageway having an input end and an output end, the stationary plate member being spaced from said peripheral surface at the input end of the passageway a distance substantially in excess of the thickness of the fruit segment and being spaced from the peripheral surface at the output end of the passageway a distance substantially the thickness of the fruit peel, said drum member being adapted to move the fruit segments through the constricting passageway to extract the juice therefrom, a housing substantially enclosing said plate member and passageway, and means for introducing an inert gas into said housing to provide a non-oxidizing atmosphere therein.

RONALD B. McKINNIS.